(12) United States Patent
Timilsina et al.

(10) Patent No.: US 11,762,545 B1
(45) Date of Patent: *Sep. 19, 2023

(54) FUTURE STATE GRAPHICAL VISUALIZATION GENERATOR

(71) Applicant: Wells Fargo Bank, N.A., San Francisco, CA (US)

(72) Inventors: Samundra Timilsina, South San Francisco, CA (US); Rabisankar Kulshi, San Ramon, CA (US); David Newman, Walnut Creek, CA (US); Darius A. Miranda, San Francisco, CA (US); Balinder Singh Mangat, Castro Valley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,385

(22) Filed: Nov. 3, 2021

Related U.S. Application Data (63) Continuation of application No. 16/004,201, filed on Jun. 8, 2018, now Pat. No. 11,169,677.

(51) Int. Cl.
*G06F 3/04847* (2022.01)
*H04L 67/306* (2022.01)

(52) U.S. Cl.
CPC ........ *G06F 3/04847* (2013.01); *H04L 67/306* (2013.01)

(58) Field of Classification Search
CPC ............................ G06F 3/04847; H04L 67/306
See application file for complete search history.

(56) References Cited

U.S. PATENT DOCUMENTS

| | | | |
|---|---|---|---|
| 7,065,513 B1 | 6/2006 | Bertrand et al. |
| 7,401,040 B2 | 7/2008 | Sloan et al. |
| 7,627,512 B2 | 12/2009 | Harris et al. |
| 7,783,545 B2 | 8/2010 | Sloan et al. |

(Continued)

FOREIGN PATENT DOCUMENTS

JP 2015125531 A 7/2015

OTHER PUBLICATIONS

"U.S. Appl. No. 16/004,201, Advisory Action dated Jun. 15, 2021".

(Continued)

*Primary Examiner* — Tan H Tran
(74) *Attorney, Agent, or Firm* — SCHWEGMAN LUNDBERG & WOESSNER, P.A.

(57) ABSTRACT

Systems and techniques for a future state graphical visualization generator are described herein, A graphical visualization of a current state of a user may be generated using electronic profile data of the user. The graphical visualization of the current state of the user may display objects associated with the user. The objects may be associated with a set of object parameters. A goal of the user may be obtained. A set of goal parameters may be generated based on the set of object parameters and the goal of the user. A graphical visualization of the future state of the user may be generated based on the set of goal parameters. A user response may be obtained to a display of the graphical visualization of the future state of the user. Guidance may be provided to the user for adjusting a goal parameter based on the user response.

17 Claims, 5 Drawing Sheets

(56) References Cited

U.S. PATENT DOCUMENTS

| | | | |
|---|---|---|---|
| 7,895,102 | B1 | 2/2011 | Wilks et al. |
| 7,899,750 | B1 | 3/2011 | Klieman et al. |
| 7,991,675 | B2 | 8/2011 | Loeper |
| 8,200,562 | B2 | 6/2012 | Sheridan |
| 10,558,740 | B1 | 2/2020 | O'malley et al. |
| 2007/0027736 | A1 | 2/2007 | Reynolds et al. |
| 2009/0307088 | A1 | 12/2009 | Littlejohn |
| 2014/0136381 | A1 | 5/2014 | Joseph et al. |
| 2015/0037771 | A1 | 2/2015 | Kaleal, III et al. |
| 2015/0279069 | A1 | 10/2015 | Melcher et al. |
| 2016/0232137 | A1 | 8/2016 | Liu |
| 2017/0238859 | A1* | 8/2017 | Sadowsky ............ A61B 5/6801 |
| 2018/0060650 | A1* | 3/2018 | de Paula ............... G06V 40/174 |
| 2018/0107660 | A1 | 4/2018 | Wang et al. |
| 2018/0225683 | A1 | 8/2018 | Gromada et al. |
| 2019/0205625 | A1* | 7/2019 | Luo ...................... G06V 30/194 |
| 2019/0209925 | A1 | 7/2019 | Benedetto et al. |
| 2019/0244427 | A1 | 8/2019 | Sun et al. |
| 2019/0347478 | A1* | 11/2019 | Sorci ...................... G06K 9/627 |
| 2019/0355063 | A1* | 11/2019 | Probetts ................. G06Q 40/06 |

OTHER PUBLICATIONS

"U.S. Appl. No. 16/004,201, Examiner Interview Summary dated Jan. 14, 2021".

"U.S. Appl. No. 16/004,201, Final Office Action dated Apr. 5, 2021".

"U.S. Appl. No. 16/004,201, Final Office Action dated Jun. 12, 2020".

"U.S. Appl. No. 16/004,201, Non Final Office Action dated Feb. 18, 2020".

"U.S. Appl. No. 16/004,201, Non Final Office Action dated Oct. 28, 2020".

"U.S. Appl. No. 16/004,201, Notice of Allowance dated Jul. 9, 2021".

"U.S. Appl. No. 16/004,201, Response filed Jan. 28, 2021 to Non Final Office Action dated Oct. 28, 2020".

"U.S. Appl. No. 16/004,201, Response filed May 18, 2020 to Non Final Office Action dated Feb. 18, 2020", 13 pgs.

"U.S. Appl. No. 16/004,201, Response filed Jun. 4, 2021 to Final Office Action dated Apr. 5, 2021".

"U.S. Appl. No. 16/004,201, Response filed Sep. 14, 2020 to Final Office Action dated Jun. 12, 2020", 13 pgs.

Berger, Rob, "5 Excellent Retirement Calculators (And All are Free)", Forbes Staff, (Jul. 12, 2015), 5 pgs.

Brut, Mihaela, "Ontology-Based Modeling and Recommendation Techniques for Adaptive Hypermedia Systems", University "Alexandru Ioan Cuza" of Ia,si Faculty of Computer Science, (Sep. 2008), 155 pgs.

Hamilton, Angela, "Simulations For Financial Literacy", B.A. University of Central Florida, (2012), 81 pgs.

Kobsa, Alfred, et al., "Personalised hypermedia presentation techniques for improving online customer relationships", The Knowledge Engineering Review, vol. 16:2, (2001), 46 pgs.

* cited by examiner

FUTURE STATE GRAPHICAL VISUALIZATION GENERATOR

CROSS-REFERENCE TO RELATED APPLICATION

This application is a continuation of U.S. patent application Ser. No. 16/004,201, filed Jun. 8, 2018, now U.S. Pat. No. 11,169,677, which is incorporated by reference herein in its entirety.

TECHNICAL FIELD

Embodiments described herein generally relate to visualization generation and, in some embodiments, more specifically to generating graphical visualizations for future states of a user.

BACKGROUND

A user may have a variety of goals. Each of the goals may include a variety of task to be performed. Attainment of the goal may result in benefits to the user. Humans may not complete tasks leading to attainment of a goal if the benefits of the goal and the tasks are temporally distant from each other. Goal setting applications may help the user track goal tasks to attempt to maintain a connection between the tasks and the benefits. Using a goal setting application may lead to better engagement of the user leading to more effective completion of tasks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A current state of a user may indicate the circumstances of the user at a present time. The circumstances may include a financial position, living arrangement, employment, health, and other factors that may impact the quality of life of the user. A future state of the user may indicate circumstances of the user at a future time. For example, the future state may indicate circumstances including living arrangement, financial position, employment, heath, and other factors several years in the future (e.g., five years, etc.). The user may work with a life coach, financial planner, or other professional to set goals that may assist the user in obtaining a desired future state. For example, the user may wish to purchase a new home and the professional may assist the user in establishing goals and corresponding tasks to achieve a future state including living in a new home.

The user may find it difficult to imagine, or may forget, how achieving the goals may lead to a change in the state of the user. To reinforce the impact of the goal on the future state of the user, it may be helpful for the user to be provided with comparative graphical visualizations of the current state and the future state. The graphical visualizations may provide the user with a realistic image of the future state that shows the user in an environment in which the goals have been achieved and the state of the user has been altered. Thus, the user may be provided with better imagery to connect the goals with an attainable future state.

The user may provide various financial goals to a tool that may generate videos or other graphical visualizations (e.g., media representations, etc.) that illustrate various future states for the user based on the goals using adjustable parameters. The parameters may include attributes of the user such as, for example, incomes, savings balance, health, etc. and external factors such as interest rates, housing costs, inflation, etc.

Adjustments may be used to vary the parameters and allow the user to see different graphical visualizations based on different parameter values. Artificial intelligence (AI) may be used to detect a reaction of the user (e.g., verbal reaction, non-verbal reaction, etc.) to the different graphical visualizations to obtain a better understanding of the ultimate goals of the user. For example, a camera may observe the user frown when presented with a future state graphical visualization which may be interpreted using artificial intelligence as an indication of disapproval of the future state. The parameters may be automatically estimated to generate additional future states until the reaction of the user is detected as one of approval (e.g., a smile, a verbal approval, etc.).

The user may have an initial set of goals in mind but may wish to consider various alternatives and receive realistic guidance regarding how to achieve their goals and a graphical visualization of what a future state with those goals achieved may look like. For example, the user may be presented with an image, video, virtual reality (VR) display, etc. to graphically illustrate various future states based on goal completion scenarios. A variety of graphical visualizations may be generated based on various changes in parameter inputs. Feedback from the graphical visualizations may be received and analyzed to provide better guidance to the user for attaining goals.

The techniques discussed herein provide a platform for holistic customer service by helping the user to determine and reach goals that may lead to desirable outcomes (e.g., future states). A user profile may be generated that may assist an organization (e.g., financial institution, financial planner, life coach, etc.) hosting a platform to focus on user satisfaction by helping the user to achieve goals that may improve the future state of the user. The user may interact with the platform using AI from anywhere in the world, at any time (e.g., twenty-four hours a day, seven days a week, etc.), and in any language. The user may walk into a location of the organization hosting the platform, and the platform may automatically recognize the user. For example, the user may be observed via a camera and facial recognition techniques may be used to identify the user. In another example, the user may login to a terminal, kiosk, or other device and the user may be identified via the provided user credentials. The identity of the user may be used to gather information from the user profile to provide a better experience by using aggregated personal details of the user including indicators of the current state of the user.

The user profile may include a variety of modules that may include a personal profile, a risk profile, and an interaction profile. Evaluating the data in the user profile may create outputs indicative of where the user is at in their life (e.g., current state) and where they want to go (e.g., in college, starting a family, kids are in college, retirement, etc.) (e.g., future state). Thus, guidance may be provided to assist the user in achieving goal such as, for example, college savings, home ownership, retirement, etc. Goal achievement may lead to better life outcomes for the user by transforming the current state of the user to a desired future state.

For example, the user may sit down in front of a display, for example, a three-panel display—at home, at a location of the organization, with an advisor, etc. The left panel may display graphical visualizations of the user's financial record; the center panel may display the user's relationships and financial picture today (e.g., the current state); and the right panel may display the user's future (e.g., the future state). The user may frame a set of goals and, using AI, a visualization, such as a simulated model, may be generated based on the user profile data, life cycle, and life events, and may be displayed along with parameters (e.g., tasks to be completed, etc.).

The user may adjust different parameters to see the impact of certain changes. In an example, a Monte Carlo simulation may be used to determine a likelihood of the user achieving various goals. Parameters such as life expectancy of the user and quality of life over time may be used in generating the visualization and other information such as fitness health data may be provided to the user. Different future state graphical visualizations may be generated taking such health information into account.

The generated graphical visualizations may include objects (e.g., houses, people, places, etc.) projected (e.g., overlaid, superimposed, merged, etc.) into the visualization. In an example, a visualization may be generated of an alternate past. For example, a visualization of what the current state of the user would look like if the user had done activity X instead of activity Y. As the user is going through the different scenarios and projections, the AI may measure emotional intelligence (e.g., emotional states such as "I'm really scared about this", "I really want this", etc.). The emotional states may be determined by detected physiological changes (e.g., breathing, heart rate, eye movement, body temperature, facial expressions, etc.). The AI may learn how the user reacts by learning behaviors and emotions to determine what the true goals of the user may be.

Graphical visualizations of different future states of the user may be generated based on different parameter choices of user, life expectancy models, etc. These graphical visualizations may represent various what-if scenarios of different tasks to be completed by the user such as for example, the purchase of house, credit needs, investment decisions, etc. The graphical visualizations may be based on inputs with different scenarios. The user may overtly respond to the graphical visualizations (e.g., selecting or saying: "scares me," "not comfortable," "not necessary," "this looks great," "I really want that," etc.). The AI may supplement or validate this information using the collected physiological information. Then, the AI may use the feedback data to create customized guidance (e.g., a financial plan, etc.) for the user. The graphical visualizations may be saved for later reference and may be replayed when triggered by various user behaviors (e.g., a task on provided in the guidance was not completed, a contradictory task was completed, etc.).

To make the graphical visualizations more realistic, external data sources may be accessed (e.g., real estate websites, hobby and special interest websites, design websites, image libraries, etc.) and items from the external data sources may be identified as real-time opportunities (e.g., ideal house comes on the market, chance to visit potential retirement location while on nearby vacation, etc.). The external data source items may be projected unto the graphical visualizations to create a visualization that more closely corresponds to the real world. User profile data (e.g., accounts, spending, location, friends, family, interests, conversation history, etc.) may be used to more closely align the generated visualization to the preferences of the user.

Figure 1:
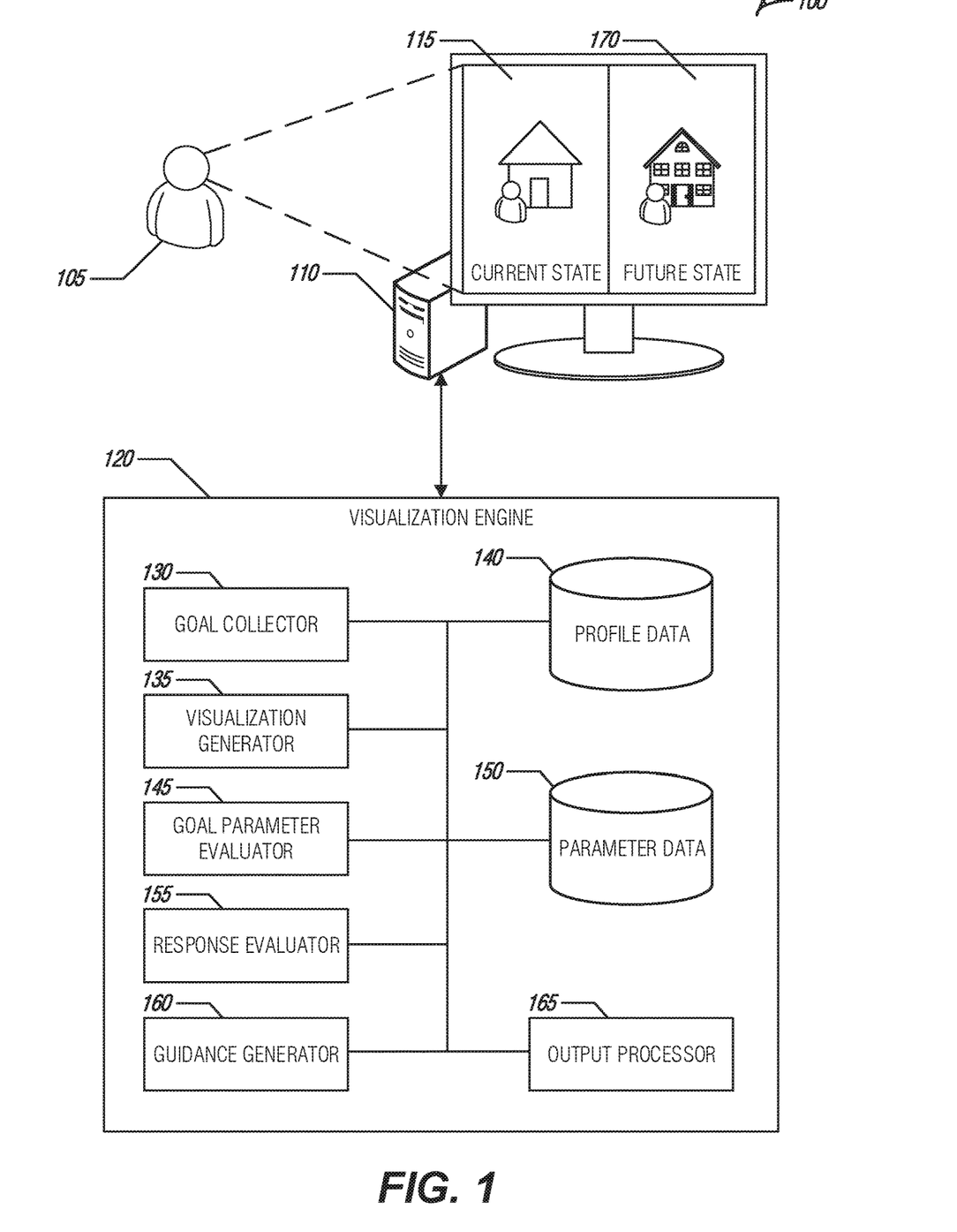
FIG. 1 is a block diagram of an example of an environment and a system for future state visualization generation by a future state graphical visualization generator, according to an embodiment.

FIG. 1 is a block diagram of an example of an environment 100 and a system 120 for future state visualization generation by a future state graphical visualization generator, according to an embodiment. The environment 100 may include a user 105 and a computing device 110 (e.g., desktop computer, laptop computer, smartphone, tablet, virtual reality system, etc.) communicatively coupled (e.g., via wired network, wireless network, cellular network, shared bus, etc.) to a visualization engine 120. The computing device 110 may include a display device (e.g., monitor, display panel, virtual reality display, etc.) for displaying a graphical visualization of a current state 115 and a graphical visualization of a future state 170. The graphical visualizations may be generated by the visualization engine 120.

The visualization engine 120 may include a variety of components including a goal collector 130, a visualization generator 135, a goal parameter evaluator 145, a response evaluator 155, a guidance generator 160, and an output processor 165. The visualization engine 120 may include a variety of data sources including electronic profile data 140 and parameter data 150. The visualization engine 120 may access a variety of external data sources (not shown) including real estate data, financial trend data, etc.

The user 105 may interact with the computing device 110 and the identity of the user 105 may be used to access profile data of the user 105 from the electronic profile data 140. The user 105 may be identified using a variety of user identification techniques such as, for example, facial recognition, authentication credentials, location-based services via a carried mobile device, using biometric sensor data, etc. The electronic profile data 140 of the user 105 may include financial information, health information, demographic information, and other data that is known about the user 105.

The goal collector 103 may obtain a goal of the user 105. In an example, the goal may be obtained from a graphical user interface presented to the user 105, For example, a variety of goals may be presented to the user 105 via a display device of the computing device 110 and the user 105 may be prompted to select a goal the user 105 would like to achieve. In another example, the user 105 may be prompted to enter a goal and a search query may be submitted against a database of goals using text entered by the user and a set of possible results may be returned to the user 105. The goal may be obtained based on a selection of the user 105 of one of the goals returned in the search results.

The visualization generator 135 may generate the graphical visualization of the current state 115 for the user 105 using the electronic profile data 140 of the user 105, The graphical visualization of the current state 115 of the user may displays objects (e.g., a home, an automobile, a family, etc.) associated with the user 105. The objects may be associated with a set of object parameters. The set of object parameters may be parameters from the electronic profile data 140, etc., that may support the object. For example, an income level of a user 105 may support a mortgage payment amount of a home displayed. In another example, the electronic profile data 140 may include a photo of the user 105 and an address of a current residence of the user 105, A photo of the current residence of the user 105 may be obtained from an external data source and the current visualization may be generated using the photo of the user 105 and the photo of the current residence. For example, a composite image may be generated with the photo of the user 105 superimposed in front of the photo of the current residence.

The goal parameter evaluator 145 may generate a set of goal parameters based on the set of object parameters and the goal of the user 105. The set of goal parameters may include object parameters of the set of object parameters that may be impacted by the user 105 achieving the goal (or underlying tasks). For example, the set of goal parameters may include financial account balances, time, age, interest rates, income, tax bracket, etc. The parameters may include expenses and other factors associated with the object included in the graphical visualization of the current state 115. For example, an object parameter may be a mortgage payment amount for the current residence, an equity balance for the current residence, number of mortgage payments left on the mortgage, age of the residence, expected maintenance costs, etc. and there may be corresponding goal parameters in the set of goal parameters.

The current state graphical visualization 115 may represent a visual representation of circumstances of the state of the user 105 at the current time. The elements of the graphical visualization may include objects that are related to the goal to be achieved. This representation may provide the user 105 with a familiar visual image of current possessions, health, financial position, etc. that are representative of the current environment in which the user 105 is currently situated based on the existing parameters included in the electronic profile data 140.

The visualization generator 135 may generate a graphical visualization of the future state 170 of the user 105 based on the set of goal parameters. In an example, the set of goal parameters may be displayed as a set of selectable user interface elements (e.g., items in a drop-down box, buttons, interactive icons, interactive text boxes, etc.) in a graphical user interface. The future state graphical visualization 170 may be created using the respective parameters corresponding to goal parameters of the set of goal parameters selected by the user. For example, the user may have a goal of obtaining a new home and goal parameters such as income, mortgage payment, financial account balance etc., may be goal parameters that the user may select and modify to model a future state. Based on the inputs received, the visualization generator 135 may search for homes (e.g., via an external data source, etc.) that may have parameters matching the goal parameters.

In an example, a set of goal parameter interactive display elements may be displayed that correspond to the set of goal parameters. A goal parameter interactive display element may correspond to a respective goal parameter. A value may be received for the respective goal parameter based on user interaction with the goal parameter interactive display element. The graphical visualization of the future state 170 may be updated based on the value for the respective goal parameter.

In an example, the future state graphical visualization 170 may include a variety of display areas that may be updated to display objects that may be associated with the user 105 based on the goal parameters. In an example, the display areas may correspond with objects displayed in the current state graphical visualization 115. For example, objects such as an automobile, family, home, etc. may be displayed in the graphical visualization of a current state 115. The objects displayed in the current state graphical visualization 115 may be based on the set of parameters. The future state graphical visualization 170 may include display areas for each object class displayed in the graphical visualization of a current state 115. The objects displayed in each display area of the future state graphical visualization 170 may be selected and displayed in a display area for that class based on the goal parameters. For example, a home or automobile may be displayed in their corresponding display areas based on the home or automobile being possible objects owned by a user 105 having goal parameters (e.g., income, savings, etc.) similar to others with similar parameters. In another example, a family with additional members, members with different clothing, etc. may be displayed in a family class display area based on the goal parameters. For example, the clothing may be similar to that worn by others with parameters similar to the goal parameters of the user 105. In another example, the goal may include having a child and a baby may be included in the family display area.

For example, the user 105 may have a financial account balance that is sufficient to provide a down payment on a home that would place a particular home within a mortgage payment limit of the user 105. An image of a home with parameters that are similar to the goal parameters may be selected and the future state graphical visualization 170 may include the image of the home and the image of the user 105 superimposed in front of the home. In an example, the time it is expected to achieve the goal may be taken into consideration and the parameters may be altered based on expected interest earnings, housing cost increases, cost of living increases, and the like. In another example, demographic data of the user 105 may be obtained from the electronic profile data 140. A set of demographic parameters may be created for the user 105 using the demographic data and the future state graphical visualization 170 may be created using the set of demographic parameters. For example, the image of the user 105 may be processed using aging techniques to present the image of the user 105 as the user 105 is expected to appear at goal achievement. This may provide the user 105 with a more realistic representation of the results of goal achievement.

The response evaluator 155 may obtain a user 105 response to a display of the future state graphical visualization 170 for the user 105. Artificial intelligence (AI) techniques including machine learning may be used to process user outputs based on the user 105 reaction to the future state graphical visualization 170. In an example, an image of the user 105 may be collected while the future state graphical visualization 170 is displayed on the display device of the computing device 110. An emotional state of the user 105 may be calculated based on an evaluation of the image and the user 105 response may be obtained using the emotional state of the user 105. For example, a facial expression of the user 105 may be extracted from the image and compared to a library of reference facial expressions that are labeled with respective emotional states. The labeling may have been completed using training data comprising a variety of training images that may have been manually or automatically labeled to assign an emotional state. Similarities between the image and the reference images may result in the selection of an emotional state (e.g., sad, happy, angry, disappointed, etc.) for the user 105.

In another example, a microphone may be used to capture audio of the user 105 and AI may be used to evaluate the audio to identify an emotional state of the user based on inflection, tone, words, phrases, etc. contained in vocalizations of the user. In another example, the user may be presented with a set of selectable response user interface elements that prompt the user 105 for input regarding emotional state and/or a reaction to the future state graphical visualization 170, The received inputs may be obtained as the user 105 response.

The guidance generator 160 may provide guidance for adjusting one or more of the respective parameters based on the user 105 response. In an example, the guidance may be provided in a graphical user interface. For example, the user 105 may express dissatisfaction with the future state graphical visualization 170 and the user 105 may be presented with guidance for altering the parameters to change the future state graphical visualization 170. For example, the user 105 may be prompted to increase a financial account balance target. To achieve this task, the user may be asked to increase an automated savings plan contribution. If the user makes a change to the financial account balance parameter via the graphical user interface, a new future state graphical visualization 170 may be created as described above and the reaction of the user 105 may be reevaluated.

In an example, a set of reaction models may be generated from training data including reaction of other users viewing graphical visualizations for respective future states of the users. The user 105 response to the display of the future state graphical visualization 170 may be compared to the set of reaction models. A reaction model of the set of reaction models may be selected based on a fit between the user 105 response and the reaction model and the guidance may be provided at least in part using the selected reaction model. For example, the reaction models may include guidance that was found to be effective in prompting respective users viewing similar graphical visualizations into altering a parameter that may lead to a more desirable future state. The success of the guidance presented to the other users may be used in generating the guidance to be presented to the user 105 based on the response to the future sate graphical visualization 170 display.

It may be helpful for the user 105 to be presented with an alternate past state graphical visualization that provides a glimpse of what the current state of the user 105 may have looked like had the user 105 achieved a past goal or related tasks. In an example, a graphical visualization for an alternate past state of the user 105 may be created based on the members of the set of goal parameters selected by the user. The graphical visualization for the alternate past state may be created using the respective parameters corresponding to the members of the set of goal parameters selected by the user. An alternate past user 105 response to a display of the graphical visualization for the alternate past state may be obtained for the user 105 and the guidance may be provided for adjusting the one or more of the respective parameters based at least in part on the alternate past user 105 response. For example, the user may express disappointment at the graphical visualization of the alternate past state and the user 105 may be prompted to make adjustments to parameters, provided a reminder that inaction may lead to undesired results, etc.

The output processor 165 may generate visual representations of the guidance, the current state graphical visualization 115, the future state graphical visualization 170, and other graphical user interface elements for display on the display device of the computing device 110. For example, the output processor 165 may format, transcode, render, or otherwise present outputs in a graphical format suitable for display on the display device of the computing device 110. In an example, the graphical visualizations may be rendered in a three-dimensional space to create a virtual reality fort the user 105 in which the user may be able to interact with and move throughout various elements of the graphical visualization (e.g., rooms in a new home, inside a new car, at a college graduation ceremony of a child, etc.).

In an example, the graphical visualization of the current state 115 may be based on the set of goal parameters. For example, expected income, financial account balance, etc. may be parameters that correspond to a particular goal (e.g., the parameters may be needed to achieve the goal). Parameter values may be identified for members of the set of goal parameters from the electronic profile data 140. The current state graphical visualization 115 may be generated using the set of goal parameters. For example, the goal parameters may indicate elements of the current state of the user 105 that should be presented in the current state graphical visualization 115. For example, parameters corresponding to the purchase of a home may be used to generate the current state graphical visualization 115 that includes the current residence of the user 105. The graphical visualization of the future state 170 may then be generated based on updated values provided by the user 105 for a goal of the set of goal parameters. For example, the user 105 may interact with an income goal parameter interactive element that is displayed to adjust an expected income level and a home object in the display may be updated based on the update to the expected income level.

Using the above techniques may provide advantages over traditional ways of providing electronic life coaching assistance to the user 105 by presenting the user 105 with more realistic representations of the cause and effect of various life choices. This may reinforce the training and may result in more effective decision making. The result is a more efficient and effective computer-based training application that may require less training cycles to effectuate results. The application may also result in shortened load times as current state information may be dynamically pulled from the user 105 electronic profile data 140 to generate rapid graphical visualizations of the states of the user. By automatically adjusting current parameters using external data such as price indexes, cost of living indexes, etc., a reduction in the storage of duplicative data may lead to increased data storage capacity needs and reduced operating costs for organizations hosting the visualization engine 120.

Figure 2:
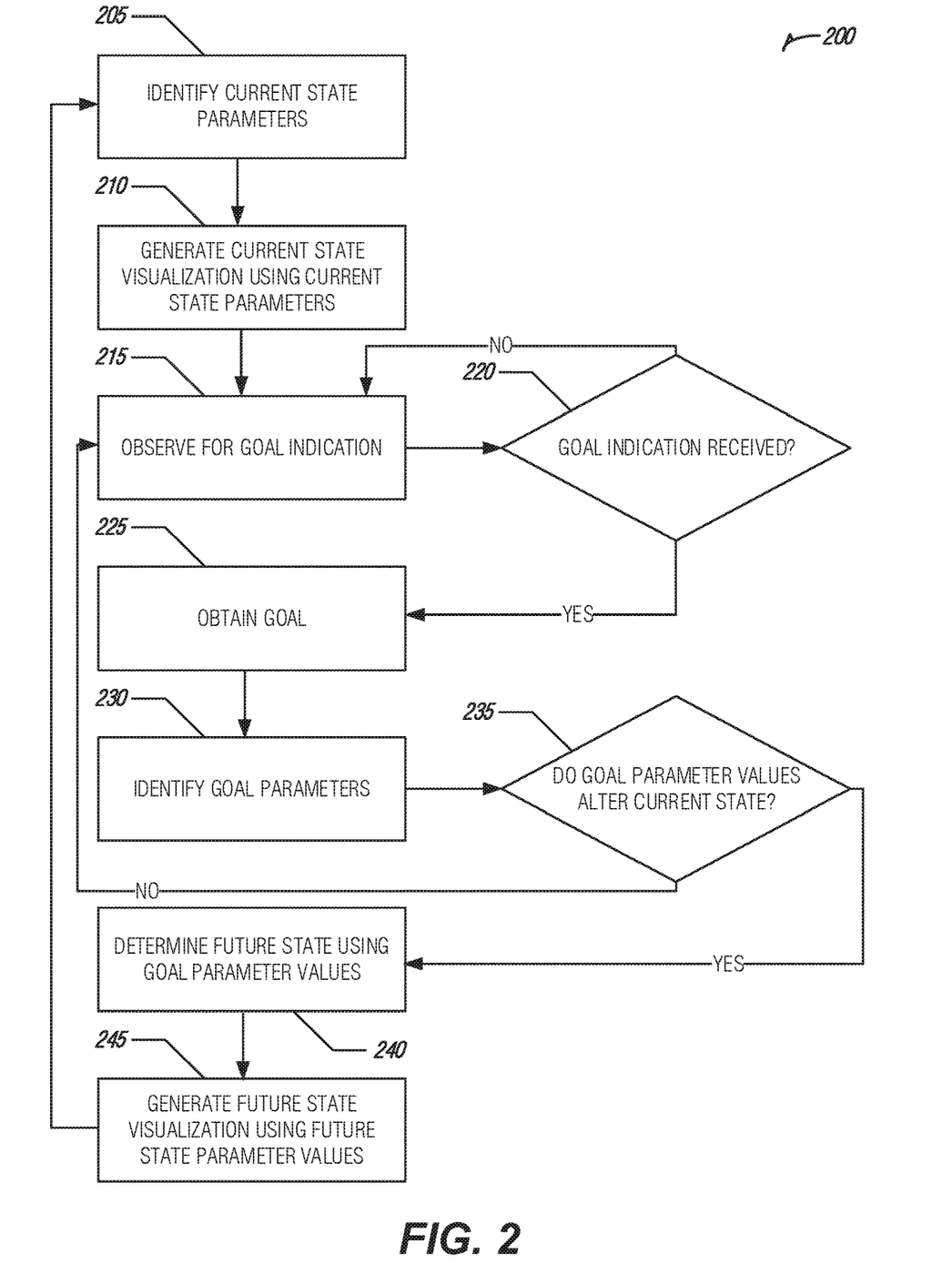
FIG. 2 illustrates a flow diagram of an example of a process for determining a future state by a future state graphical visualization generator, according to an embodiment.

FIG. 2 illustrates a flow diagram of an example of a process 200 for determining a future state by a future state graphical visualization generator, according to an embodiment. The process 200 may provide features as discussed in the description of FIG. 1.

A user may interact with a computing device hosting the future state visualization generator. The user may be identified using a variety of user identification techniques and profile data may be retrieved from a data source based on the identity of the user. Current state parameters may be identified using the profile data of a user (e.g., at operation 205).

For example, financial parameters, health parameters, housing parameters, etc. may be obtained from the profile data of the user. A current state visualization may be generated using the current state parameters (e.g., at operation 210). The current state visualization may be generated for output on a display device of the computing device. For example, the current state visualization may be generated for display in a first area of the display device.

While the user is interacting with the computing device, inputs received may be observed for a goal indication (e.g., at operation 215). If received inputs do not include a goal indication (e.g., as determined at decision 220), the inputs will continue to be monitored (e.g., at operation 215). If the received inputs include a goal indication (e.g., as determined at decision 220), a goal may be obtained based on the revived inputs (e.g., at operation 225). The goal may be evaluated to identify goal parameters (e.g., at operation 230). Goal parameters may include parameters that may be subject to change upon achievement of the goal. The goal parameters may be evaluated (e.g., at decision 235) to determine if the goal parameter values that may result upon achievement of the goal may alter the current state. For example, the goal may include a mortgage payment parameter and the value of the mortgage payment value may be evaluated to determine if it will impact one or more of the current state parameters such as, for example, a financial saving goal, etc. If the goal parameter values do not alter the current state, the inputs will continue to be monitored for a goal indication (e.g., at operation 215).

Additional calculations may be performed to determine a future state for the user using the goal parameter values (e.g., at operation 240). For example, home affordability calculations may be performed to determine whether the user may be able to afford a new home based on the goal parameter values. A future state visualization may be generated using future state parameter values (e.g., at operation 245). The future state parameter values may include the results of the calculations used in determining the future state. Generating the future state visualization may include accessing external data sources to obtain data such as, for example, product cost data, product images, etc. that may be used in generating the future state visualization. For example, an image of the user may be super imposed in front of a home that is identified in external data as being compatible with the future state parameter values. The future state visualization may then be generated for output on the display device of the computing device. For example, the future state visualization may be generated for display in a second area of the display device next to the current state visualization.

Figure 3:
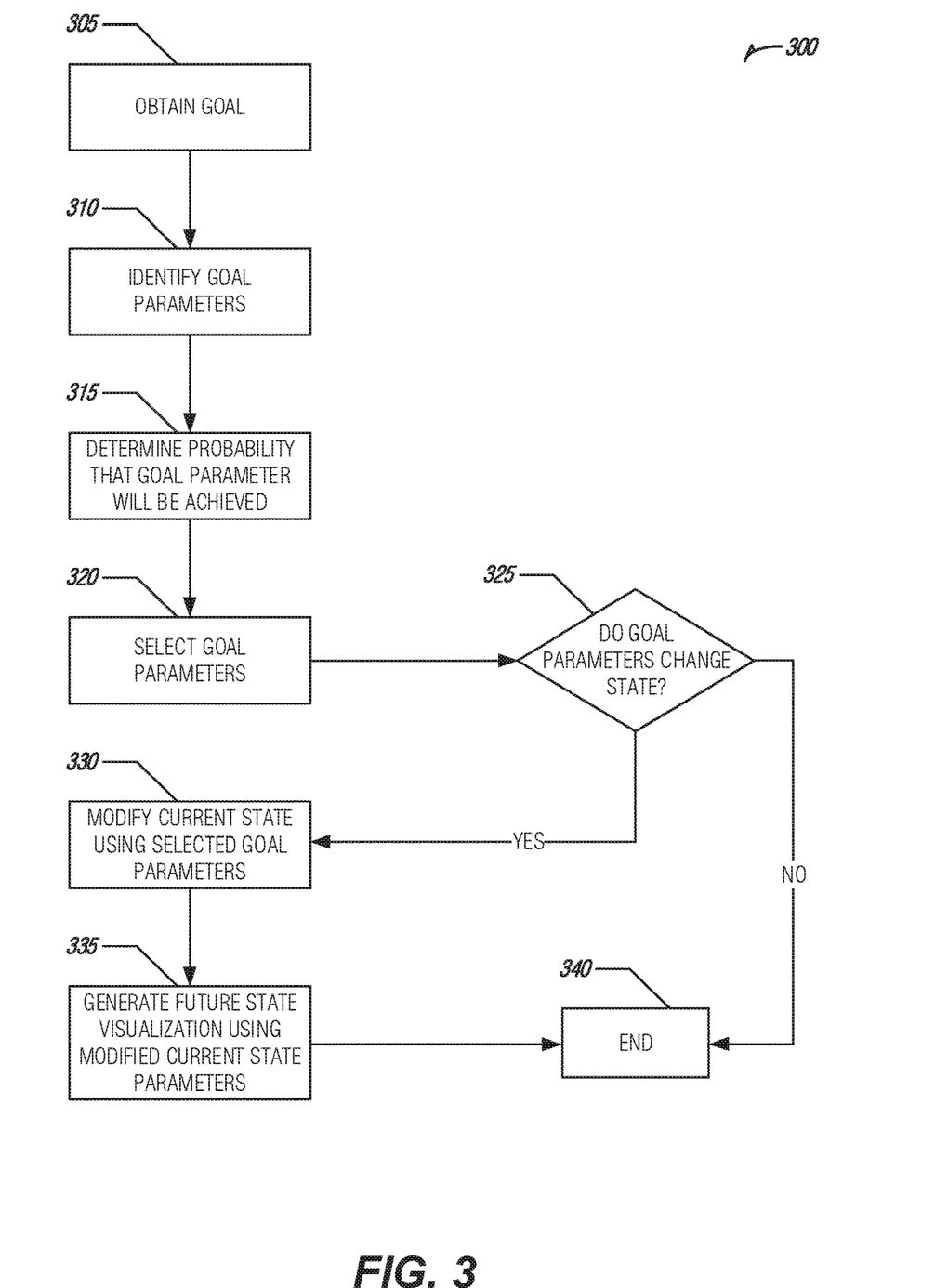
FIG. 3 illustrates a flow diagram of an example of a process for goal parameter selection by a future state graphical visualization generator, according to an embodiment.

FIG. 3 illustrates a flow diagram of an example of a process 300 for goal parameter selection by a future state graphical visualization generator, according to an embodiment. The process 300 may provide features as discussed in FIGS. 1 and 2.

A user may be interacting with a computing device executing the future state visualization generator. During the interaction a goal of the user may be obtained (e.g., at operation 305). For example, the user may have a goal to purchase a new home that may be identified based on user reaction to new homes, input received from the user via a graphical user interface expressing an interest in purchasing a new home, etc. Parameters of the goal may be identified (e.g., at operation 310). For example, the purchase of a new home may include parameters such as down payment, mortgage payment amount, interest rate, income qualification amount, mortgage length, etc.

Probabilities may be calculated that indicate respective probabilities that each of the parameters may be achieved by the user (e.g., at operation 315). For example, based on evaluation of profile data of the user it may be determined that the income of the user has an increasing trend and based on the trend line intersecting the income qualification amount, the probability of the user achieving the income qualification amount may be calculated as likely to be achieved or 0.75, In another example, an evaluation of the profile data may indicate that the user has a financial account value sufficient to achieve the down payment amount so the probability may be determined to be very likely to be achieved or 0.9.

The goal parameters may be selected based on the probability they will be achieved (e.g., at operation 320). In an example, it may be determined that the goal is not achievable based on the profile data indicating that one or more parameters may not be likely to be achieved. In such a case, the user may be presented a prompt indicating that the goal is unlikely to be achieved given the current understanding of the state of the user. The user may be presented with guidance for making changes to the current state that may result in a higher likelihood of parameter achievement. If the user indicates that the changes may be made, the process 300 may continue.

The selected goal parameters may be evaluated to determine if they change the current state of the user (e.g., at decision 325). For example, a higher mortgage payment parameter may lead to a decreased a monthly savings account goal parameter based on the expected income level of the user at goal achievement. If it is determined that the goal parameters do not change the current state of the user the processes 300 may end (e.g., at end 340). If it is determined that the goal parameters do change the current state of the user, the current state of the user may be modified using the selected goal parameters (e.g., at operation 330). For example, a future state parameter set may be created using the current state parameters modified using the goal state parameters. The future state parameter set may represent a model of what the current state of the user is expected to be at the time the parameters (or goal) are achieved.

A future state visualization may be generated using the modified current state parameters (e.g., at operation 335). For example, the future state parameter set may be used to create a visual image of the future state of the user. For example, an image of the user may be presented in front of an image of a new home that matches the selected goal parameters. The future state visualization may be presented on a display device of the computing device with which the user is interacting. In an example, the future state visualization may be presented next to a visualization of the current state of the user.

Figure 4:
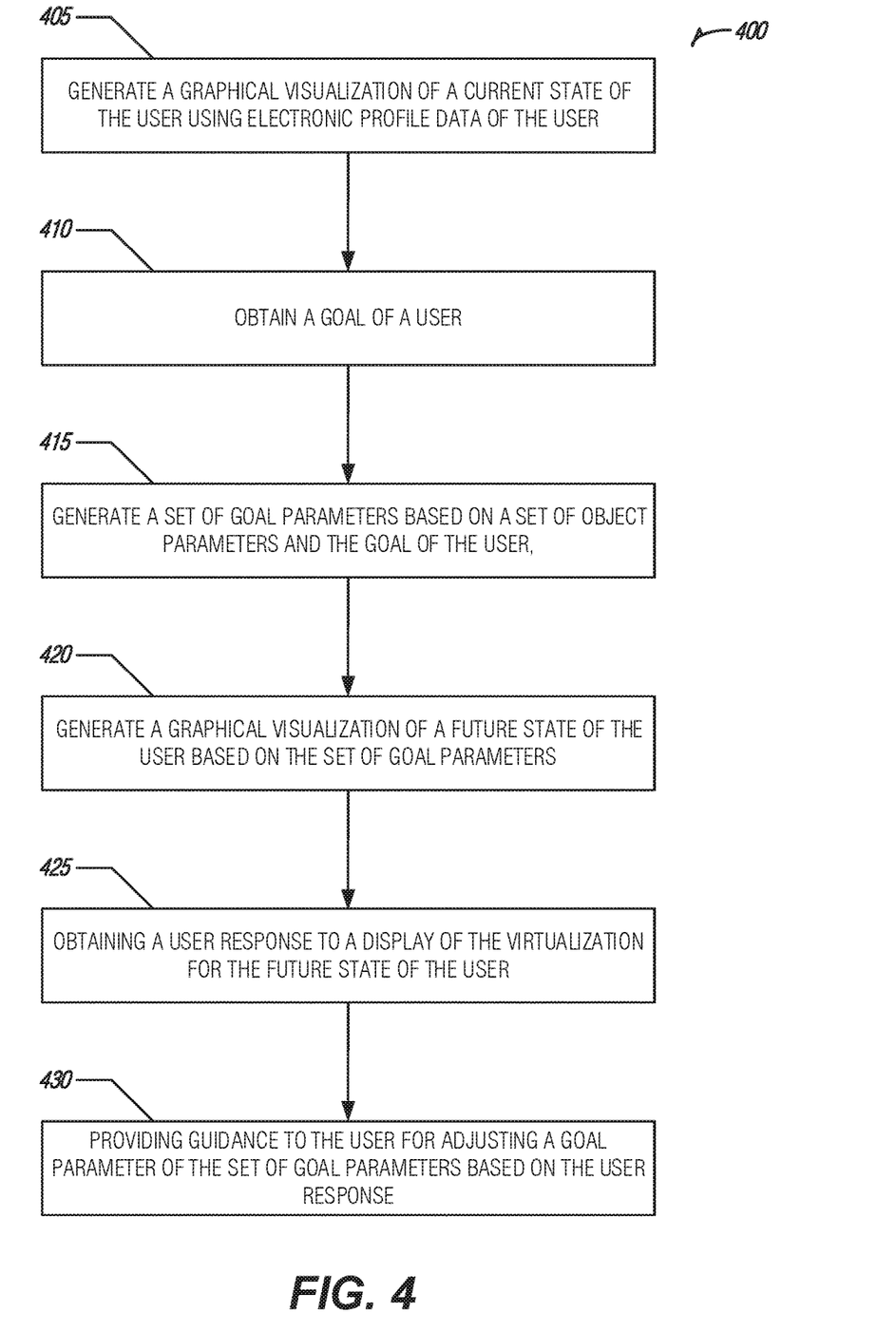
FIG. 4 illustrates an example of a method for a future state graphical visualization generator, according to an embodiment.

FIG. 4 illustrates an example of a method 400 for a future state graphical visualization generator, according to an embodiment. The method 400 may provide features described in FIGS. 1-3.

At operation 405, a graphical visualization of a current state of the user using electronic profile data of the user (e.g., by the visualization generator 135 as described in FIG. 1). The graphical visualization of the current state of the user may display objects associated with the user. The objects may be associated with a set of object parameters.

At operation 410, a goal of the user may be obtained (e.g., by the goal collector 130 as described in FIG. 1). In an example, the goal of the user may be obtained from a graphical user interface presented to the user. In another example, the goal may be obtained by evaluating inputs received during interactions between the user and a computing device to determine the likelihood that the user desires to achieve an identified goal. For example, machine learning may be used to identify user reactions to certain outputs and the goal may be obtained based on a reaction of the user to the display of an output corresponding to the goal.

At operation 415, a set of goal parameters may be generated (e.g., by the goal parameter evaluator 145 as described in FIG. 1) based on the set of object parameters and the goal of the user. In an example, the set of goal parameters may be displayed as a set of selectable user interface elements in a graphical user interface. In an example, parameter values may be identified for members of the set of goal parameters from the electronic profile data In an example, a set of goal parameters may be obtained that correspond to the goal. Parameter values may be identified for members of the set of goal parameters from the electronic profile data. The graphic visualization of the current state of the user may be generated using the set of goal parameters.

At operation 420, a graphical visualization of the future state of the user may be generated (e.g., by the visualization generator 135 as described in FIG. 1) based on the set of goal parameters. In an example, demographic data of the user may be obtained from the electronic profile data. A set of demographic parameters may be created for the user using the demographic data and the graphical visualization of the future state of the user may include using the set of demographic parameters.

At operation 425, a user response to a display of the graphical visualization of the future state of the user may be obtained (e.g., by the response evaluator 155 as described in FIG. 1). In an example, an image of the user may be captured while the visualization for the future state of the user is displayed. An emotional state of the user may be calculated based on an evaluation of the image and the user response may be obtained using the emotional state of the user.

At operation 430, guidance (e.g., generated by the guidance generator 160 as described in FIG. 1) may be provided (e.g., by the output processor 160 as described in FIG. 1) to the user for adjusting a goal parameter of the set of goal parameters based on the user response. In an example, the guidance may be provided in a graphical user interface. In an example, a set of reaction models may be generated from training data including reaction data of other users viewing graphical visualizations for respective future states of the users. User response to the display of the graphical visualization of the future state for the user may be compared to the set of reaction models. A reaction model of the set of reaction models may be selected based on a fit between the user response and the reaction model and the guidance may be provided at least in part using the selected reaction model.

In an example, a graphical visualization of an alternate past state of the user may be generated using members of the set of goal parameters. An alternate past user response may be obtained to a display of the graphical visualization of the alternate past state of the user and the guidance provided for adjusting the goal parameter may be based at least in part on the alternate past user response.

In an example, a set of goal parameter interactive display elements may be displayed that correspond to the set of goal parameters. A goal parameter interactive display element may correspond to a respective goal parameter. A value for the respective goal parameter may be received based on user interaction with the goal parameter interactive display element and the graphical visualization of the future state may be updated based on the value for the respective goal parameter.

Figure 5:
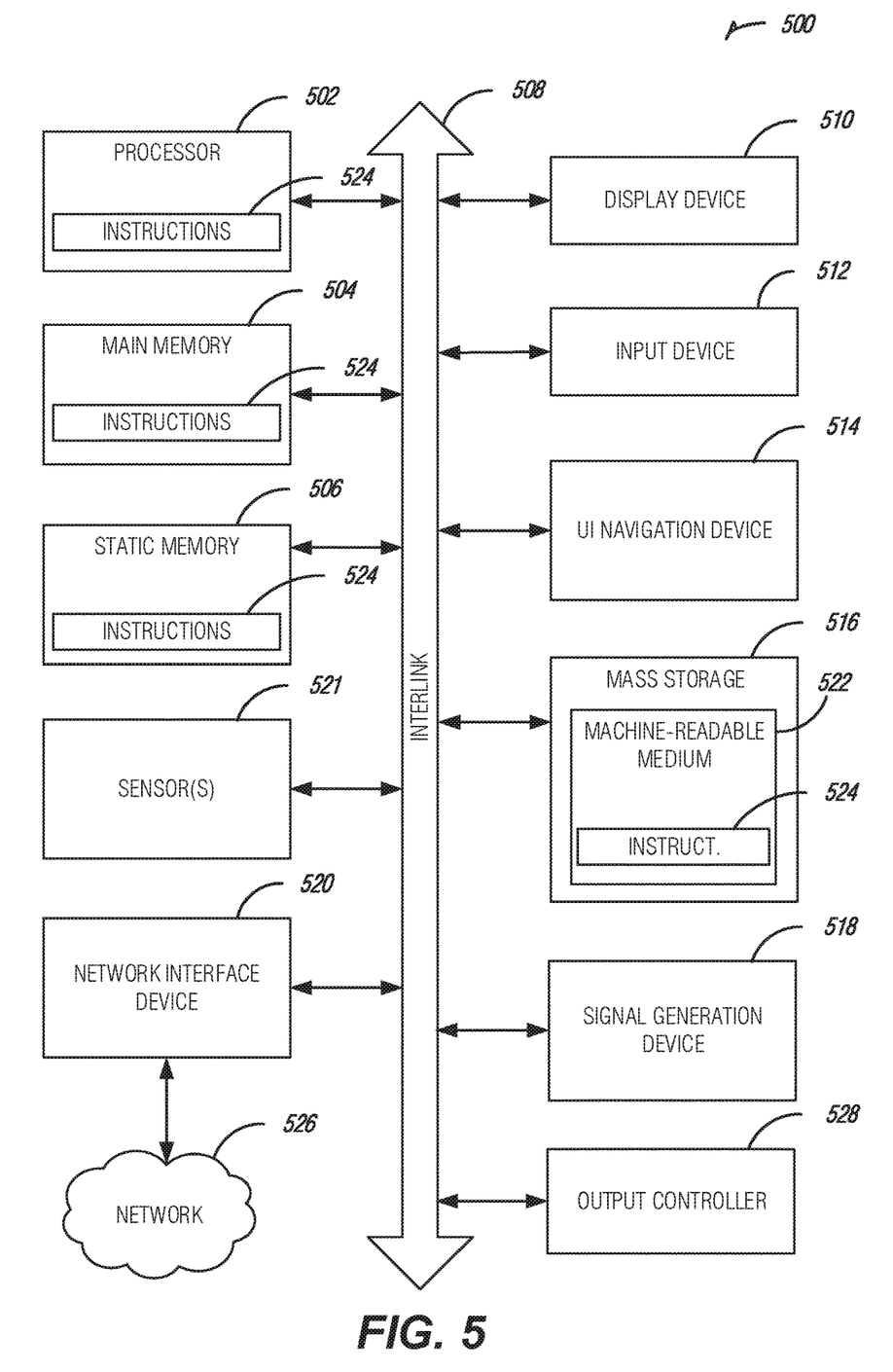
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse), In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine readable media). Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SLMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain: English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for creating a graphical visualization for a future state of a user, the system comprising:
   at least one processor; and
   memory including instructions that, when executed by the at least one processor, cause the at least one processor to perform operations to:
      store a library of reference facial expressions, the reference facial expressions being labelled with emotional states using a machine learning model where training data comprising training mages having assigned emotional states is provided to the machine learning model;
      train the machine learning model with the training images to identify user responses;
      identify current state parameters of a user with profile data associated with the user;
      generate a graphical visualization of a current state of the user using the current state parameters of the user, the graphical visualization of the current state of the user displaying objects associated with the user where the objects are associated with a set of object parameters;
      obtain a goal of the user;
      identify a set of goal parameters based on the set of object parameters and the goal of the user;
      evaluate the set of goal parameters to determine if the set of goal parameters alter the current state of the user;
      generate a graphical visualization of a future state of the user when the set of goal parameters alter the current state of the user;
      obtain a user response to a display of the graphical visualization of the future state of the user, wherein obtaining the user response includes:
         capturing an image of the user while the graphical visualization of the future state of the user is displayed; and
         capturing an auditory response of the user while the graphical visualization of the future state of the user is displayed;
      evaluating the auditory response of the user;
      identify an expression associated with the user response by applying the trained machine learning model to the captured image and evaluating the auditory response of the user;
      identifying the emotional state as disapproval of the display of the graphic visualization of the future state of the user based on the evaluation of the auditory response and the image of the user while the graphical visualization of the future state of the user is displayed;
      determine:
         a physiological state of the user based on the user response; and
         the expression as disapproval; and
      update the set of goal parameters on the display of the graphic visualization of the future state of the user automatically until the physiological state of the user is determined by the machine learning model to be approval; wherein determining the physiological state of the user is based on an evaluation of physiological conditions of the user captured during display of the graphical visualization of the future state of the user.

2. The system of claim 1, wherein the current state parameters include one of financial parameters associated with the user, health parameters associated with the user, or housing parameters associated with the user.

3. The system of claim 1, wherein the set of goal parameters includes a first goal and a second goal and the set of goal parameters alter the current state of the user when one of the first goal and the second goal impacts the goal of the user.

4. The system of claim 1, wherein when obtaining the user response, the memory includes further instructions that, when executed by the at least one processor, cause the at least one processor to perform operations to:
   identify an emotional state of the user by
      identifying a facial expression of the user with the trained machine learning model, wherein identifying the facial expression includes comparing the captured image of the user with the labelled facial expressions and identifying the facial expression.

5. The system of claim 1, further comprising instructions that, when executed by the at least one processor, cause the at least one processor to:
   generate a set of reaction models from training data including reaction data of other users viewing graphical visualizations for respective future states of the users;
   compare the user response to the display of the graphical visualization of the future state for the user to the set of reaction models; and
   select a reaction model of the set of reaction models based on a fit between the user response and the reaction model, wherein identifying the expression associated with the user is based at least in part using the selected reaction model.

6. The system of claim 1, wherein the goal of the user is obtained from a graphical user interface presented to the user.

7. At least one non-transitory machine readable medium including instructions for creating a visualization for a future state of a user that, when executed by at least one processor, cause the at least one processor to perform operations to:
   store a library of reference facial expressions, the reference facial expressions being labelled with emotional states using a machine learning model where training data comprising training images having assigned emotional states is provided to the machine learning model;
   train the machine learning model with the training images to identify user responses;
   identify current state parameters of a user with profile data associated with the user;
   generate a graphical visualization of a current state of the user using the current state parameters of the user, the graphical visualization of the current state of the user displaying objects associated with the user where the objects are associated with a set of object parameters;
   obtain a goal of the user;
   identify a set of goal parameters based on the set of object parameters and the goal of the user;
   evaluate the set of goal parameters to determine if the set of goal parameters alter the current state of the user;

generate a graphical visualization of a future state of the user when the set of goal parameters alter the current state of the user;

obtain a user response to a display of the graphical visualization of the future state of the user, wherein obtaining the user response includes:
  capturing an image of the user while the graphical visualization of the future state of the user is displayed; and
  capturing an auditory response of the user while the graphical visualization of the future state of the user is displayed;

evaluating the auditory response of the user;

identify an expression associated with the user response by applying the trained machine learning model to the captured image and evaluating the auditory response of the user;

identifying the emotional state as disapproval of the display of the graphic visualization of the future state of the user based on the evaluation of the auditory response and the image of the user while the graphical visualization of the future state of the user is displayed;

determine:
  a physiological state of the user based on the user response; and
  the expression as disapproval; and update the set of goal parameters on the display of the graphic visualization of the future state of the user automatically until the physiological state of the user is determined by the machine learning model to be approval, wherein determining the physiological state of the user is based on an evaluation of physiological conditions of the user captured during display of the graphical visualization of the future state of the user.

8. The at least one non-transitory machine readable medium of claim 7, wherein the current state parameters include one of financial parameters associated with the user, health parameters associated with the user, or housing parameters associated with the user.

9. The at least one non-transitory machine readable medium of claim 7, wherein the set of goal parameters includes a first goal and a second goal and the set of goal parameters alter the current state of the user when one of the first goal and the second goal impacts the goal of the user.

10. The at least one non-transitory machine readable medium of claim 7, wherein when obtaining the user response, the at least one non-transitory machine readable medium comprises further instructions that, when executed by the at least one processor, cause the at least one processor to perform operations to
  identify an emotional state of the user by
  identifying a facial expression of the user with the trained machine learning model, wherein identifying the facial expression includes comparing the captured image of the user with the labelled facial expressions and identifying the facial expression.

11. The at least one non-transitory machine readable medium of claim 10, the at least one non-transitory machine readable medium comprising further instructions that, when executed by the at least one processor, cause the at least one processor to:
  generate a set of reaction models from training data including reaction data of other users viewing graphical visualizations for respective future states of the users;
  compare the user response to the display of the graphical visualization of the future state for the user to the set of reaction models; and
  select a reaction model of the set of reaction models based on a fit between the user response and the reaction model, wherein identifying the expression associated with the user is based at least in part using the selected reaction model.

12. The at least one non-transitory machine readable medium of claim 7, wherein the goal of the user is obtained from a graphical user interface presented to the user.

13. A method performed by processing circuitry of a computing device for creating a visualization for a future state of a user, the method comprising:
  storing a library of reference facial expressions, the reference facial expressions being labelled with emotional states using a machine learning model where training data comprising training images having assigned emotional states is provided to the machine learning model;
  training the machine learning model with the training images to identify user responses;
  identifying current state parameters of a user with profile data associated with the user;
  generating a graphical visualization of a current state of the user using the current state parameters of the user, the graphical visualization of the current state of the user displaying objects associated with the user where the objects are associated with a set of object parameters;
  obtaining a goal of the user;
  identifying a set of goal parameters based on the set of object parameters and the goal of the user;
  evaluating the set of goal parameters to determine if the set of goal parameters alter the current state of the user;
  generating a graphical visualization of a future state of the user when the set of goal parameters alter the current state of the user;
  obtaining a user response to a display of the graphical visualization of the future state of the user, wherein obtaining the user response includes:
    capturing an image of the user while the graphical visualization of the future state of the user is displayed; and
    capturing an auditory response of the user while the graphical visualization of the future state of the user is displayed;
  evaluating the auditory response of the user;
  identifying an expression associated with the user response by applying the trained machine learning model to the captured image and evaluating the auditory response of the user;
  identifying the emotional state as disapproval of the display of the graphic visualization of the future state of the user based on the evaluation of the auditory response and the image of the user while the graphical visualization of the future state of the user is displayed;
  determining:
    a physiological state of the user based on the user response; and
    the expression as disapproval; and
  updating the set of goal parameters on the display of the graphic visualization of the future state of the user automatically until the physiological state of the user is determined by the machine learning model to be approval, wherein determining the physiological state of the user is based on an evaluation of physiological conditions of the user captured during display of the graphical visualization of the future state of the user.

14. The method of claim 13, wherein the current state parameters include one of financial parameters associated with the user, health parameters associated with the user, or housing parameters associated with the user.

15. The method of claim 13, wherein the set of goal parameters includes a first goal and a second goal and the set of goal parameters alter the current state of the user when one of the first goal and the second goal impacts the goal of the user.

16. The method of claim 13, wherein when obtaining the user response, the method further comprises
   identifying an emotional state of the user by
      identifying a facial expression of the user with the trained machine learning model, wherein identifying the facial expression includes comparing the captured image of the user with the labelled facial expressions and identifying the facial expression.

17. The method of claim 13, further comprising:
   generating a set of reaction models from training data including reaction data of other users viewing graphical visualizations for respective future states of the users;
   comparing the user response to the display of the graphical visualization of the future state for the user to the set of reaction models; and
   selecting a reaction model of the set of reaction models based on a fit between the user response and the reaction model, wherein identifying the expression associated with the user is based at least in part using the selected reaction model.

* * * * *

UNITED STATES PATENT AND TRADEMARK OFFICE
CERTIFICATE OF CORRECTION

PATENT NO. : 11,762,545 B1  
APPLICATION NO. : 17/453385  
DATED : September 19, 2023  
INVENTOR(S) : Timilsina et al.

Page 1 of 1

It is certified that error appears in the above-identified patent and that said Letters Patent is hereby corrected as shown below:

On the Title Page

In item (57), in "Abstract", in Column 2, Line 2, delete "herein," and insert --herein.-- therefor In the Claims In Column 15, Line 23, in Claim 1, delete "mages" and insert --images-- therefor In Column 16, Line 5, in Claim 1, delete "approval;" and insert --approval,-- therefor Signed and Sealed this  
Seventh Day of November, 2023

Katherine Kelly Vidal  
*Director of the United States Patent and Trademark Office*